(12) United States Patent
Simpson et al.

(10) Patent No.: US 11,695,234 B2
(45) Date of Patent: Jul. 4, 2023

(54) CABLE ORGANIZER FOR A PLUGGABLE MODULE

(71) Applicant: TE Connectivity Services GmbH, Schaffhausen (CH)

(72) Inventors: Jeffrey Stewart Simpson, Mechanicsburg, PA (US); Craig Warren Hornung, Harrisburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 44 days.

(21) Appl. No.: 17/186,086

(22) Filed: Feb. 26, 2021

(65) Prior Publication Data
US 2022/0278484 A1 Sep. 1, 2022

(51) Int. Cl.
| | |
|---|---|
| *H01R 13/58* | (2006.01) |
| *G02B 6/42* | (2006.01) |
| *H01R 13/6592* | (2011.01) |
| *H01R 13/502* | (2006.01) |

(52) U.S. Cl.
CPC ....... *H01R 13/5804* (2013.01); *G02B 6/4246* (2013.01); *H01R 13/502* (2013.01); *H01R 13/6592* (2013.01)

(58) Field of Classification Search
CPC .............. H01R 13/5804; H01R 13/502; H01R 13/6592; G02B 6/4246
See application file for complete search history.

(56) References Cited

U.S. PATENT DOCUMENTS

| | | | |
|---|---|---|---|
| 8,057,250 | B2 | 11/2011 | Lim |
| 8,770,990 | B2 | 7/2014 | Sytsma et al. |
| 8,979,553 | B2 | 3/2015 | Lloyd et al. |
| 9,385,466 | B2 | 7/2016 | Henry et al. |
| 10,128,647 | B2 | 11/2018 | Gutgold et al. |
| 10,637,176 | B1 * | 4/2020 | Campbell .............. H01R 13/62 |
| 2018/0019554 | A1 | 1/2018 | Yang et al. |

\* cited by examiner

*Primary Examiner* — Oscar C Jimenez
*Assistant Examiner* — Paul D Baillargeon

(57) ABSTRACT

A pluggable module includes a housing and cables arranged as a cable bundle extending from a module cavity of the housing. Each cable includes first and second conductors and an insulator surrounding the conductors. Each cable is obround shaped having generally flat first and second ends and semi-circular first and second sides between the first and second ends. The pluggable module includes a cable organizer coupled to the cable bundle to position the cables relative to each other. The cable organizer has cable channels receiving and holding the cables such that at least a first subset of the cables are oriented with the first and second ends non-parallel to the first and second ends of a second subset of the cables.

20 Claims, 6 Drawing Sheets

CABLE ORGANIZER FOR A PLUGGABLE MODULE

BACKGROUND OF THE INVENTION

The subject matter herein relates generally to pluggable module assemblies.

Some communication systems utilize transceivers or pluggable modules as I/O modules for data communication. The pluggable module is pluggably received in a receptacle cage of a receptacle assembly to interconnect the pluggable module with a host circuit board, such as through a communication connector mounted to the host circuit board. The pluggable module includes a bundle of cables that exit the pluggable module and route to another component. Some known high-speed cables are twin-axial cables having a pair of conductors arranged within an insulator, which is surrounded by a cable shield. The positions of the conductors relative to the cable shield is precisely designed to control signal integrity along the signal transmission paths. For example, the spacing is equidistant for each cable conductor to the cable shield. However, the cables are subjected to bending between the components. Bending of the cable at the top or bottom is less problematic than bending at one side or the other. For example, bending at the top or the bottom does not affect relative spacing between either conductor and the cable shield. In contrast, bending at the side causes a bulge in the insulator, leading to different spacing between the conductors relative to the cable shield. The difference in spacing causes skew and other performance degradation, which is undesirable.

A need remains for a cable organizer that reduces skew and increases performance in the system.

BRIEF DESCRIPTION OF THE INVENTION

In one embodiment, a pluggable module is provided. The pluggable module includes a housing having a top wall, a bottom wall and sidewalls between the top wall and the bottom wall. The housing forms a module cavity. The housing has a mating end configured to be mated with a communication connector of a receptacle assembly. The housing has a cable end opposite the mating end. The pluggable module includes a module circuit board received in the module cavity. The module circuit board has a card edge at a front of the module circuit board configured to be plugged into a card slot of the communication connector. The module circuit board has board contacts proximate to the card edge. The module circuit board has cable contacts electrically connected to the board contacts. The pluggable module includes cables arranged as a cable bundle extending from the module cavity at the cable end. Each cable includes a first conductor, a second conductor and at least one insulator surrounding the first and second conductors. The first and second conductors are terminated to corresponding cable contacts of the module circuit board. Each cable is obround shaped having a first end and a second end opposite the first end and parallel to the first end and has a first side and a second side between the first and second ends are semi-circular. The pluggable module includes a cable organizer coupled to the cable bundle to position a plurality of the cables relative to each other. The cable organizer has cable channels receiving corresponding cables and holding the cables such that at least a first subset of the cables are oriented with the first and second ends non-parallel to the first and second ends of a second subset of the cables.

In another embodiment, a pluggable module is provided. The pluggable module includes a housing having a top wall, a bottom wall and sidewalls between the top wall and the bottom wall. The housing forms a module cavity. The housing has a mating end configured to be mated with a communication connector of a receptacle assembly. The housing has a cable end opposite the mating end. The pluggable module includes a module circuit board received in the module cavity. The module circuit board has a card edge at a front of the module circuit board configured to be plugged into a card slot of the communication connector. The module circuit board has board contacts proximate to the card edge. The module circuit board has cable contacts electrically connected to the board contacts. The pluggable module includes cables arranged as a cable bundle extending from the module cavity at the cable end. Each cable includes a first conductor, a second conductor and at least one insulator surrounding the first and second conductors. The first and second conductors are terminated to corresponding cable contacts of the module circuit board. Each cable is obround shaped has a first end and a second end opposite the first end and parallel to the first end and has a first side and a second side between the first and second ends are semi-circular. The pluggable module includes a cable organizer coupled to the cable bundle to position a plurality of the cables relative to each other. The cable organizer includes a top, a bottom, a first side, and a second side. The cable organizer has cable channels receiving corresponding cables. The cable channels hold the cables in the cable organizer such that the first and second ends of the cables are oriented at approximately 45° relative to the top and the bottom of the cable organizer.

In a further embodiment, a cable organizer for organizing cables in a cable bundle is provided. Each cable has a first conductor, a second conductor and at least one insulator surrounding the first and second conductors. Each cable is obround shaped has a first end and a second end opposite the first end and parallel to the first end and has a first side and a second side between the first and second ends are semi-circular. The cable organizer includes a main body including a top, a bottom, a first side, and a second side. The main body extends between a front and a rear. The cable organizer includes cable channels extending through the main body between the front and the rear. The cable channels are configured to receive corresponding cables. The cable channels hold the cables in the cable organizer such that the first and second ends of the cables are oriented at approximately 45° relative to the top and the bottom of the cable organizer.

DETAILED DESCRIPTION OF THE INVENTION

Figure 1:
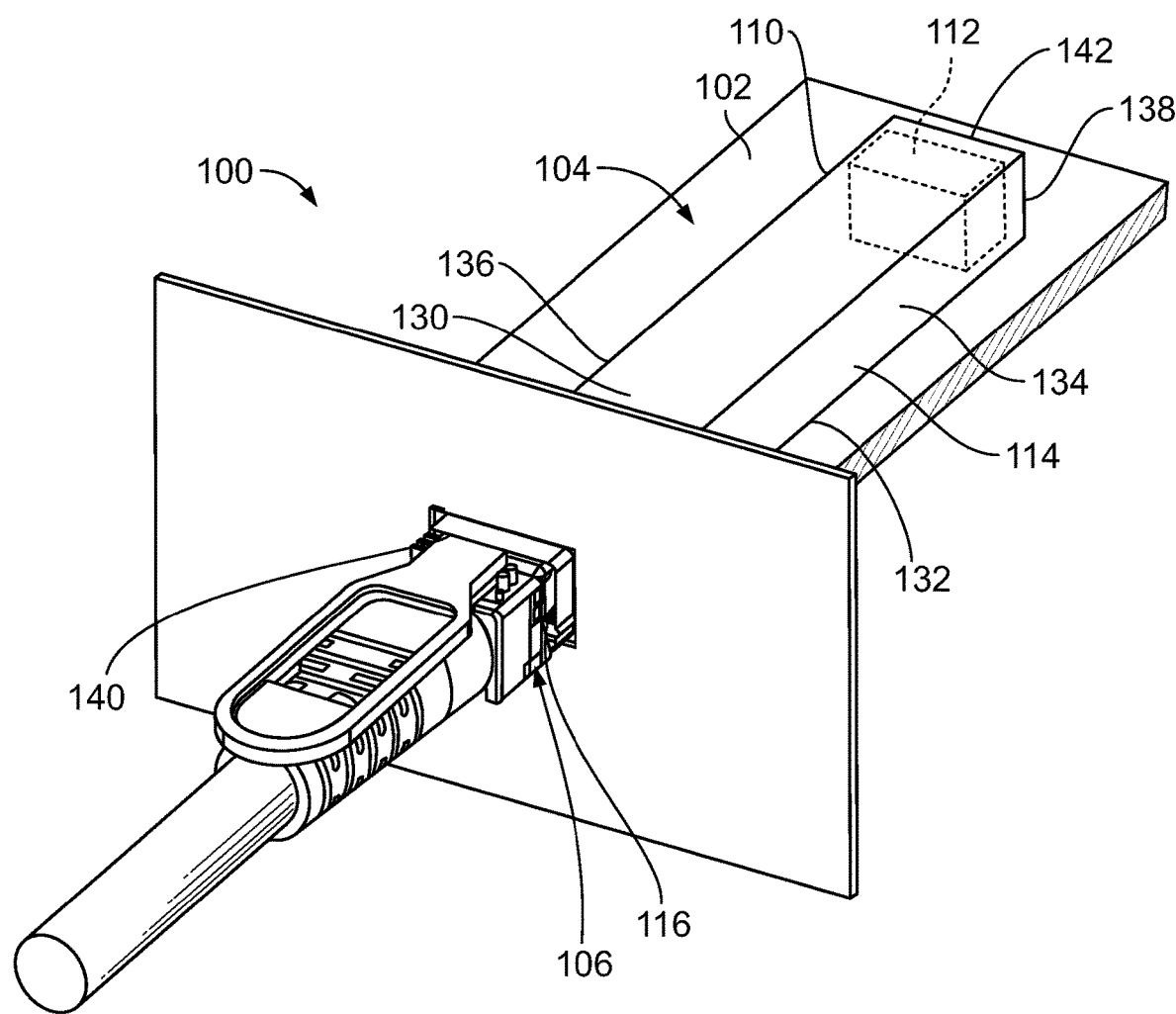
FIG. 1 is a top perspective view of a communication system including a pluggable module formed in accordance with an exemplary embodiment.

FIG. 1 is a top perspective view of a communication system 100 formed in accordance with an exemplary embodiment. The communication system 100 includes a circuit board 102 and a receptacle connector assembly 104 mounted to the circuit board 102. A pluggable module 106 is electrically connected to the receptacle connector assembly 104. The pluggable module 106 is electrically connected to the circuit board 102 through the receptacle connector assembly 104. The pluggable module 106 is pluggable into and removable from the receptacle connector assembly 104.

In an exemplary embodiment, the receptacle connector assembly 104 includes a receptacle cage 110 and a communication connector 112 (shown in phantom) adjacent the receptacle cage 110. For example, in the illustrated embodiment, the communication connector 112 is received in the receptacle cage 110. In other various embodiments, the communication connector 112 may be located rearward of the receptacle cage 110.

In various embodiments, the receptacle cage 110 is enclosed and provides electrical shielding for the communication connector 112 and the pluggable module 106. The receptacle cage 110 is configured to surround at least a portion of the pluggable module 106 to provide shielding for the pluggable module 106. The receptacle cage 110 includes a plurality of cage walls 114 that define one or more module channels 116 for receipt of corresponding pluggable modules 106. The cage walls 114 may be walls defined by solid sheets, perforated walls to allow airflow therethrough, walls with cutouts, such as for a heat transfer device such as a heatsink, heat spreader, cold plate, and the like to pass therethrough, or walls defined by rails or beams with relatively large openings, such as for airflow therethrough.

In the illustrated embodiment, the receptacle cage 110 includes a single module channel 116 for receiving a single pluggable module 106. The receptacle cage 110 has a port that is open at the front of the receptacle cage 110 to receive the pluggable module 106. Any number of module channels 116 may be provided in various embodiments. For example, the receptacle cage 110 may constitute a stacked cage member having upper and lower module channels 116 to receive multiple pluggable modules 106 in a stacked arrangement in an alternative embodiment. The upper and lower module channels 116 may be arranged in a single column; however, the receptacle cage 110 may include multiple columns of ganged module channels 116 in alternative embodiments (for example, 2×2, 3×2, 4×2, 4×3, etc.). In other various embodiments, rather than being a stacked cage member, the receptacle cage 110 may include ganged module channels 116 in a single row (for example, 1×2, 1×4, etc.). Optionally, multiple communication connectors 112 may be arranged within the receptacle cage 110, such as when multiple columns or rows of module channels 116 are provided.

In an exemplary embodiment, the cage walls 114 of the receptacle cage 110 include a top wall 130, a bottom wall 132, a first side wall 134, a second side wall 136 and a rear wall 138. The bottom wall 132 may rest on the circuit board 102. However, in alternative embodiments, the receptacle cage 110 may be provided without the bottom wall 132. The receptacle cage 110 extends between a front end 140 and a rear end 142. The port(s) is provided at the front end 140 to receive the pluggable module 106 through the front end 140. The cage walls 114 define a cavity. For example, the cavity may be defined by the top wall 130, the bottom wall 132, the side walls 134, 136 and the rear wall 138. The cavity defines the module channel 116 that receives the pluggable module 106. The cavity receives the communication connector 112. Other cage walls 114 may separate or divide the cavity into a plurality of module channels 116, such as stacked or ganged module channels. For example, the cage walls 114 may include a divider (not shown), such as a horizontal divider (for example, a separator plate), positioned between upper and lower module channels 116 or a vertical separator panel (not shown), such as parallel to the side walls 134, 136.

In an exemplary embodiment, the pluggable modules 106 are loaded into the receptacle cage 110 through the front end 140 to mate with the communication connector 112. The shielding cage walls 114 of the receptacle cage 110 provide electrical shielding around the communication connector 112 and the pluggable modules 106, such as around the mating interfaces between the communication connector 112 and the pluggable modules 106.

In various embodiments, a gasket (not shown) may be provided at the front end 140 to interface with the pluggable module 106. For example, gasket fingers may interface with the pluggable module 106 to electrically common the receptacle cage 110 and the pluggable module 106. The gasket fingers span across any space between the cage walls 114 and the pluggable module 106 to prevent EMI leakage along the cage walls 114 and/or the walls of the pluggable module 106. The gasket may interface with an exterior component, such as a panel or chassis that receives the receptacle cage 110.

Figure 2:
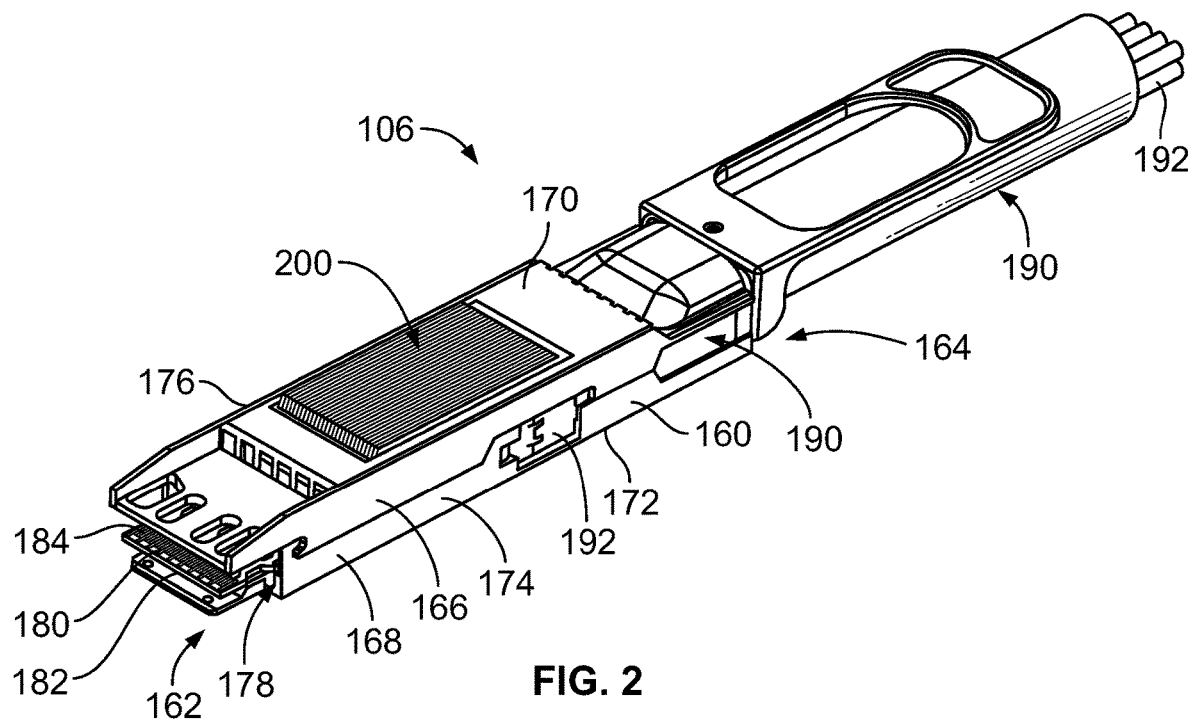
FIG. 2 is a perspective view of the pluggable module in accordance with an exemplary embodiment.

FIG. 2 is a perspective view of the pluggable module 106 in accordance with an exemplary embodiment. The pluggable module 106 has a housing 160. The housing 160 is defined by one or more shells, such as an upper shell 166 and a lower shell 168. The housing 160 may be thermally conductive and/or may be electrically conductive, such as to provide EMI shielding for the pluggable module 106. The housing 160 includes a mating end 162 and an opposite cable end 164. The mating end 162 is configured to be inserted into the corresponding module channel 116 (shown in FIG. 1). A cable bundle 190, having a plurality of cables 192, extends from the cable end 164 to another component within the system.

The housing 160 includes a top wall 170, a bottom wall 172, a first side wall 174 extending between the top wall 170 and the bottom wall 172, and a second side wall 176 extending between the top wall 170 and the bottom wall 172. The top wall 170 is part of the upper shell 166 and the bottom wall 172 is part of the lower shell 168. The first side wall 174 may be defined by the upper shell 166 and/or the lower shell 168. The second side wall 176 may be defined by the upper shell 166 and/or the lower shell 168. For example, in an exemplary embodiment, the upper and lower shells 166, 168 meet at an interface approximate centered along the side walls 174, 176. Alternatively, the upper shell 166 may be a cap or lid coupled to the top ends of the side walls 174, 176, which are part of the lower shell 168. The housing 160 surrounds a module cavity 178. The module cavity 178 houses electrical components of the pluggable module 106. The cables 192 extend into the module cavity 178 for termination to the electrical components.

In an exemplary embodiment, the pluggable module 106 includes a module circuit board 180 in the module cavity 178. The module circuit board 180 may be accessible at the mating end 162. The module circuit board 180 is configured to be communicatively coupled to the communication connector 112 (shown in FIG. 1). For example, a mating edge 182 of the module circuit board 180 may be plugged into the communication connector 112, such as in a card slot of the communication connector 112. The module circuit board 180 includes board contacts 184 at the mating edge 182 for electrical connection with the communication connector 112. The board contacts 184 are electrically connected to the cables 192, such as having the cables 192 soldered to pads on the module circuit board 180.

Figure 3:
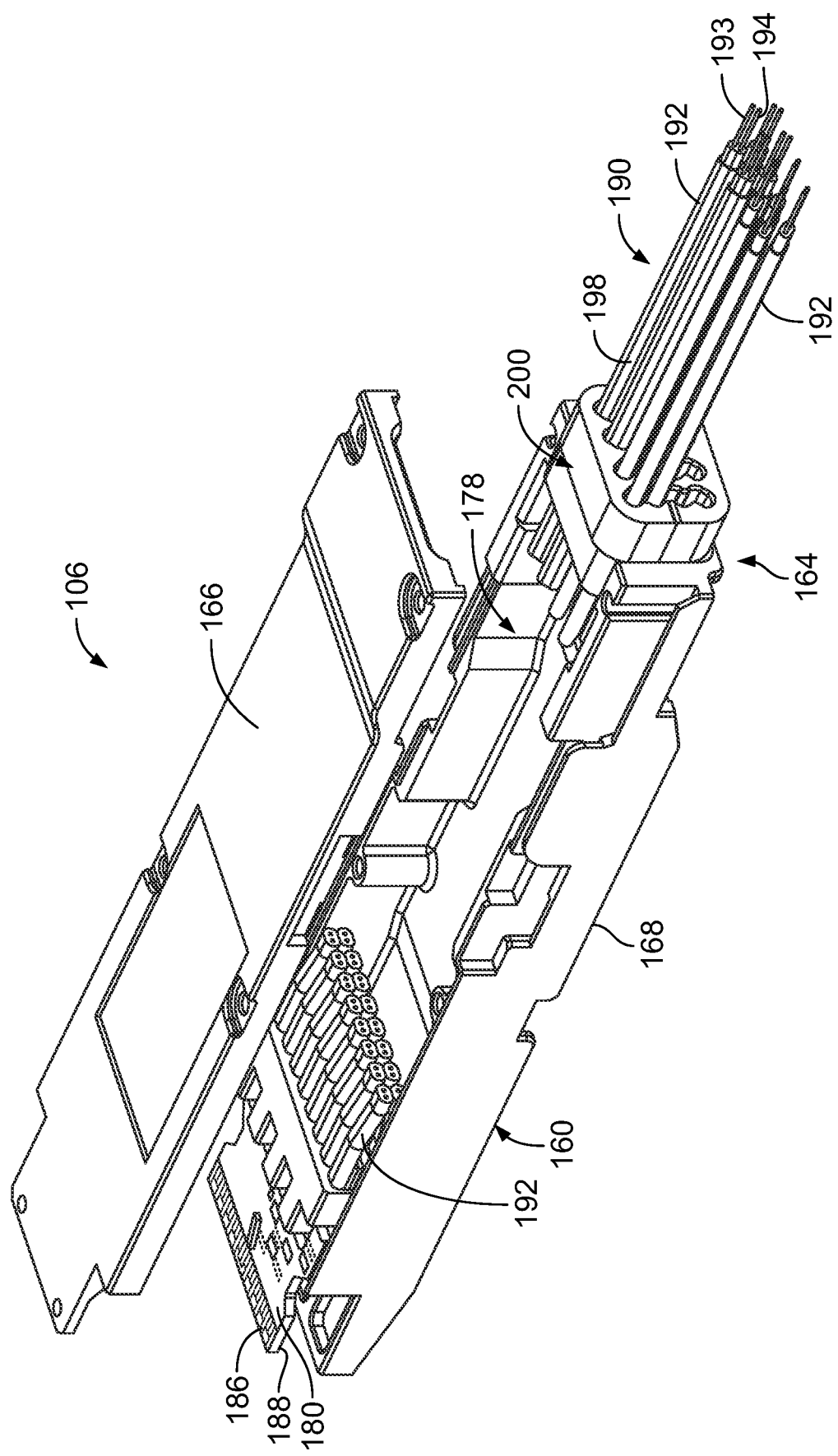
FIG. 3 is an exploded view of the pluggable module in accordance with an exemplary embodiment.

FIG. 3 is an exploded view of the pluggable module 106 in accordance with an exemplary embodiment. FIG. 3 illustrates the upper shell 166 exploded from the lower shell 168 to illustrate internal parts of the pluggable module 106. Some of the cables 192 of the cable bundle 190 have been removed and some of the cables 192 have been sectioned to illustrate components of the pluggable module 106. In the illustrated embodiment, the cables 192 are twin-axial cables each having a pair of conductors, such as to transmit differential signals. The pluggable module 106 includes a cable organizer 200 used to organize the cables 192 within the cable bundle 190. For example, the cable organizer 200 may orient the cables 192 relative to each other at the cable exit from the cable end 164. Optionally, the cable organizer 200 may be provided at the cable end 164. In various embodiments, the cable organizer 200 may be located downstream of the housing 160, such as within the cable bundle 190 to locate the cables 192 relative to each other.

Figure 4:
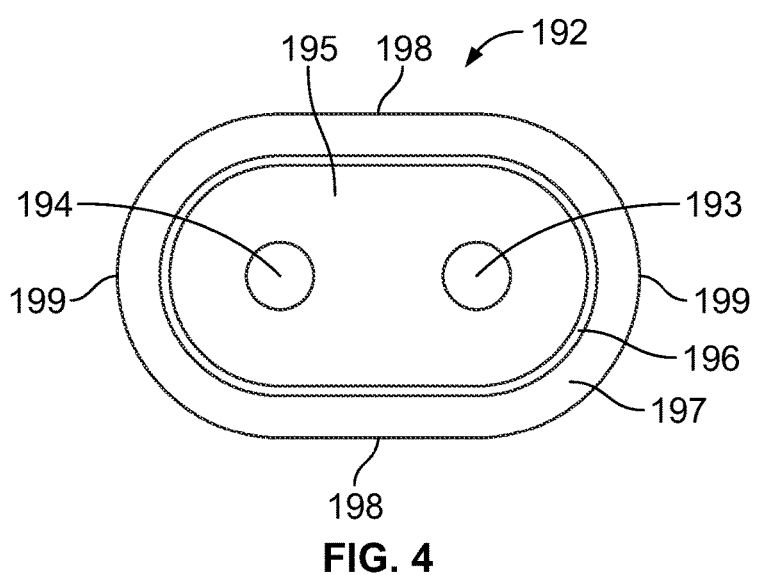
FIG. 4 is a cross sectional view of a cable of the pluggable module in accordance with an exemplary embodiment.

With additional reference to FIG. 4, which is a cross sectional view of the cable 192, each cable 192 includes a first conductor 193 and a second conductor 194 and at least one insulator 195 in the cable core. For example, a single insulator 195 may be extruded with the first and second conductors 193, 194. Alternatively, each conductor 193, 194 may be extruded with its own corresponding insulator 195. The cable 192 includes a cable shield 196 surrounding the insulator 195 and an outer jacket 197 surrounding the cable shield 196. The dual axial design of the cable 192 elongates the cable in a lateral (for example, side-to-side) direction. The cable 192 may be oval shaped in various embodiments. For example, the cable 192 is obround, such as being stadium or racetrack shaped. For example, the cable 192 has a rectangular center section with rounded corners at the sides. The cable 192 includes opposite first and second ends 198 and opposite first and second sides 199. The ends 198 may be generally parallel to each other. The sides 199 are curved between the ends 198. For example, the sides 199 may be semi-circles with the ends extending parallel to each other from the tangents of the semi-circles defined by the sides 199.

Returning to FIG. 3, the cables 192 are terminated to an end of the module circuit board 180. For example, the first and second conductors 193, 194 may be soldered to pads or circuits on the module circuit board 180, such as to both upper and lower surfaces 186, 188 of the module circuit board 180. In the illustrated embodiment, the cable bundle 190 includes sixteen differential pair cables 192; however, the cable bundle 190 may include greater or fewer cables 192 in alternative embodiments.

Figure 5:
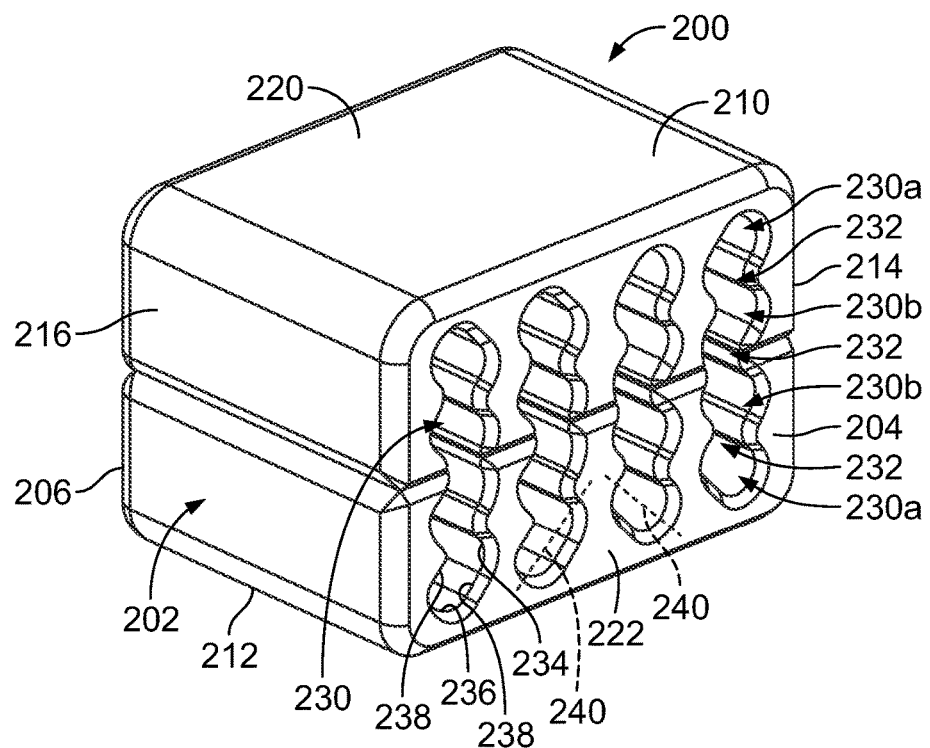
FIG. 5 is a front perspective view of a cable organizer of the pluggable module in accordance with an exemplary embodiment.

FIG. 5 is a front perspective view of the cable organizer 200 in accordance with an exemplary embodiment. The cable organizer 200 is configured to be coupled to the exterior of the cables 192 to position the cables relative to each other. In an exemplary embodiment, the cable organizer 200 is used to orient the cables 192 to mitigate bad-way bending of the cables 192 along their paths and to encourage good-way bending of the cables 192. Bad-way bending is bending that occurs at the short sides 199 of the cables 192 such that one conductor of the cable 192 is positioned radially outward of the other conductor of the cable 192. Good-way bending is bending that occurs at the long ends 198 of the cable 192, such as along the flat ends 198. The cable organizer 200 angles the cables 192 at predetermined angles to ensure that the cables 192 bend along the ends 198 (with one of the ends 198 at the radially interior of the cable 192), rather than along the sides 199 (with one of the sides 199 at the radially interior of the cable 192). As such, the cable organizer 200 encourages good-way bending (FIGS. 8 and 9) and discourages bad-way bending (FIG. 7) to improve signal integrity of the cables 192.

The cable organizer 200 includes a main body 202 extending between a front 204 and a rear 206. The cable organizer 200 includes a top 210, a bottom 212, a first side 214, and a second side 216. The sides 214, 216 extend between the top 210 and the bottom 212 and extend between the front 204 and the rear 206. The cable organizer 200 may be box-shaped having a generally rectangular cross-section. Optionally, the corners may be curved. The cable organizer may have other shapes in alternative embodiments, such as having a circular or oval cross-section. In an exemplary embodiment, the main body 202 may be a multi-piece body. For example, in the illustrated embodiment, the main body 202 includes an upper body portion 220 and a lower body portion 222. The portions 220, 222 may be coupled together.

The cable organizer 200 includes cable channels 230 configured to receive corresponding cables 192. The cable channels 230 extend through the main body 202 between the front 204 and the rear 206. The cable channels 230 are sized and shaped to receive the cables 192 and orient the cables 192 (for example, tightly hold the cables 192) relative to each other. For example, the cable channels 230 may be complimentary shaped to the cables 192. In an exemplary embodiment, the cable channels 230 are oval shaped. For example, the cable channels 230 may be generally obround.

In an exemplary embodiment, the cable channels 230 include openings or slots 232 that allow loading of the cables 192 into the generally obround cable channels 230. For example, the upper body portion 220 may include outer cable channels 230a and inner cable channels 230b. Slots 232 are open at the bottom of the upper body portion 220 for loading the cables 192 into the inner cable channels 230b. In an exemplary embodiment, slots 232 are provided between the inner cable channels 230b and the outer cable channels 230a for loading the cables 192 into the outer cable channels 230a through the inner cable channels 230b. Alternatively, slots 232 may be provided at the top of the upper body portion 220 for loading the cables 192 into the outer cable channels 230a. The lower body portion 222 may include inner cable channels 230b and outer cable channels 230a. Slots 232 are open at the top of the lower body portion 222 for loading the cables 192 into the inner cable channels 230b. In an exemplary embodiment, slots 232 are provided between the inner cable channels 230b and the outer cable channels 230a for loading the cables 192 into the outer cable channels 230a through the inner cable channels 230b. Alternatively, slots 232 may be provided at the bottom of the lower body portion 222 for loading the cables 192 into the outer cable channels 230a.

In an exemplary embodiment, each cable channel 230 is defined by a first cable side support 234, a second cable side support 236, and a cable end support 238 extending between the first and second cable side supports 234, 236. The cable end support 238 may be generally opposite the slot 232. For example, the cable channel 230 may be open at the slot 232 between the first and second side supports 234, 236 to receive the cable 192. The cable channel 230 is configured to receive the cable 192 such that one of the ends 198 of the cable 192 engages the cable end support 238, one of the sides 199 of the cable 192 engages the first cable side support 234 and the other side 199 of the cable 192 engages the second cable side support 236. The cable channel 230 has a lateral axis 240 between the first and second cable side supports 234, 236. The cable end support 238 is oriented generally parallel to the lateral axis 240.

In an exemplary embodiment, the cable channels 230 are oriented at skewed angles to angle the cables 192 as the cables 192 pass through the cable organizer 200. For example, the cable end support 238 may be oriented non-parallel to the top 210 and the bottom 212. As such, the cable channels 230 are configured to hold the cables 192 such that the ends 198 of the cables are non-parallel to the top 210 and the bottom 212. In various embodiments, the cable channels 230 may be oriented with the lateral axes 240 at approximately 45°. However, the cable channels 230 may be oriented at other angles in alternative embodiments. Optionally, different cable channels 230 may be oriented at different angles, such as angles between 30° and 60°. In various embodiments, some cable channels 230 may be oriented at approximately +45° while other cable channels 230 may be oriented at approximately −45° to orient the cables 192 at different angles relative to each other. As such, the cable end supports 238 of a subset of the cable channels 230 may be oriented non-parallel to the cable end supports 238 of another subset of the cable channels 230.

Figure 6:
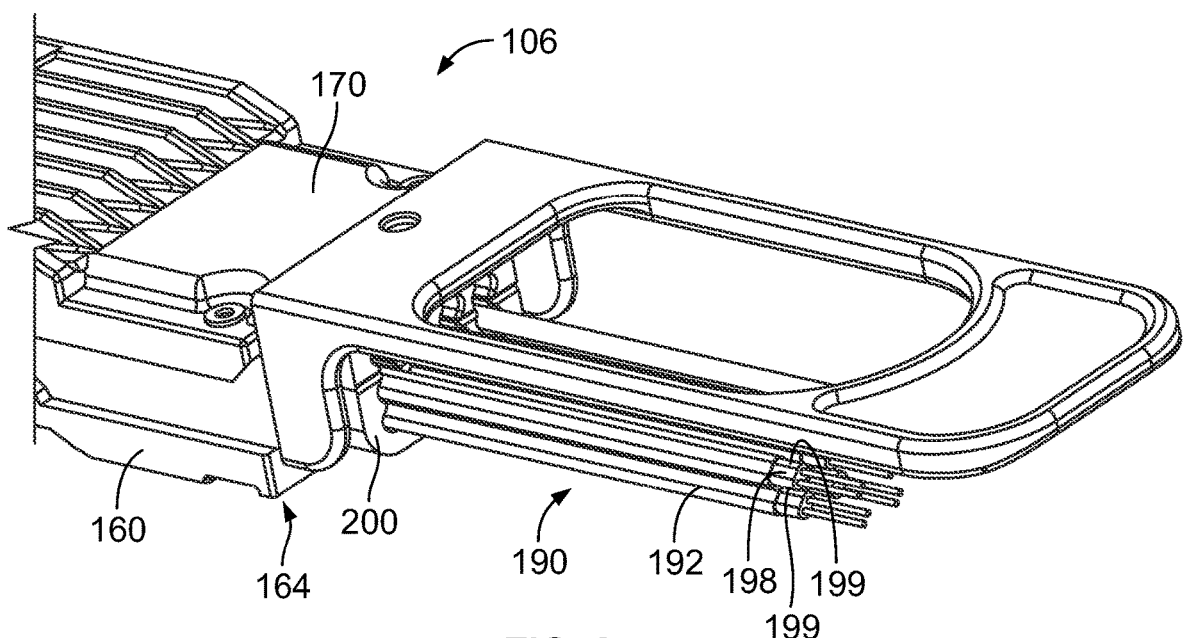
FIG. 6 is a perspective view of a portion of the pluggable module in accordance with an exemplary embodiment showing the cable organizer coupled to the housing and supporting the cables.

FIG. 6 is a perspective view of a portion of the pluggable module 106 in accordance with an exemplary embodiment showing the cable organizer 200 coupled to the housing 160 and supporting the cables 192. The cables 192 extend from the cable end 164. The cable organizer 200 supports and positions the cables 192 at the cable exit. In an exemplary embodiment, the cable organizer 200 twists or angles the cables 192 at the cable exit at skewed cable exit angles. For example, the ends 198 of the cables 192 are angled non-horizontal. The ends 198 of the cables 192 are non-parallel to the top wall 170 and the bottom wall 172. The ends 198 may be held at approximately 45° angles relative to horizontal (for example, approximately 45° relative to the top wall 170 and the bottom wall 172). If the cable bundle 190 were bent to the right or to the left downstream of the cable organizer 200, the cables would tend to roll over such that the cables 192 bend about the ends 198 (i.e., the flat or long sides) rather than bending about the sides 199 (i.e., the rounded or short sides). Orienting the cables 192 at the skewed cable exit angles encourages good-way bending and discourages bad-way bending.

With additional reference back to FIG. 3, the cable organizer 200 tends to twist the cables 192 from normal cable lay orientations (for example, horizontal cable lay). The cables 192 are oriented at the skewed angles both upstream and downstream of the cable organizer 200. For example, the cable organizer 200 may hold the cables 192 such that the ends 198 of the cables 192 are non-parallel to upper and lower surfaces 186, 188 of the module circuit board 180. The cables 192 are partially twisted in the module cavity 178 between the module circuit board 180 and the cable organizer 200. The cables 192 have first sections that pass through the module cavity 178 from the module circuit board 180 to the cable organizer 200 and second sections that pass through the cable organizer 200. The cables 192 have a first pattern along the first sections and a second pattern along the second sections different from the first pattern. For example, the first pattern may have the cables 192 in an 8×2 matrix with the ends 198 oriented horizontally while the second pattern may have the cables 192 in a 4×4 matrix with the ends 198 oriented non-horizontally and non-vertically, such as a first subset at approximately +45° angles and a second subset at approximately −45° angles. The cables 192 twist or rotate from the first orientation to the second orientation. In an exemplary embodiment, the cable organizer 200 holds the cables 192 such that at least a first subset of the cables 192 are oriented with the ends 198 non-parallel to the ends 198 of a second subset of the cables 192 (for example, first subset at +45° and second subset at −45°).

Figure 7:
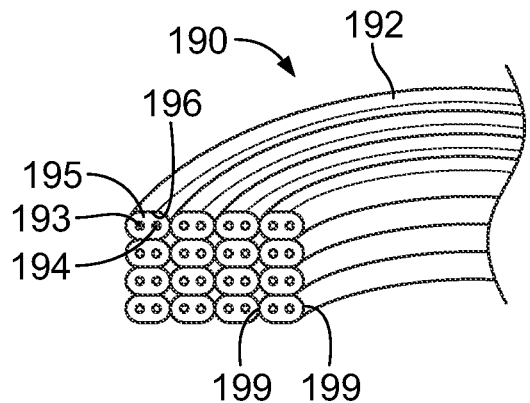
FIG. 7 is a cross-sectional view of the cable bundle showing the cables subjected to bad-way bending.

FIG. 7 is a cross-sectional view of the cable bundle 190 showing the cables 192 subjected to bad-way bending. Bad-way bending is undesirable. When the cables 192 are bent in a bad-way (less desirable), compared to being bent in a good-way (more desirable), the cables 192 are bent or rotated such that the sides 199 are at the radially interiors of the cables 192. Bending as such causes a bulge in the insulator 195, leading to different spacing between the conductors 193, 194 relative to the shield 196. The difference in spacing causes skew and other performance degradation, which is undesirable. The cable organizer 200 (FIG. 6) is used to prevent bad-way bending from the cable exit from the pluggable module 106.

Figure 8:
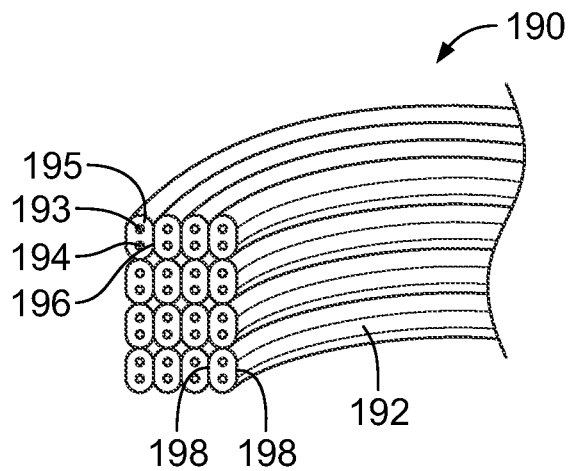
FIG. 8 is a cross-sectional view of the cable bundle showing the cables subjected to good-way bending.
Figure 9:
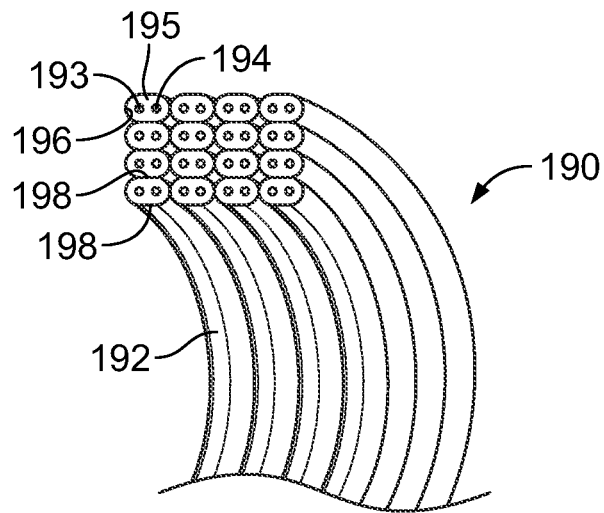
FIG. 9 is another cross-sectional view of the cable bundle showing the cables subjected to good-way bending.

FIG. 8 is a cross-sectional view of the cable bundle 190 showing the cables 192 subjected to good-way bending. FIG. 9 is another cross-sectional view of the cable bundle 190 showing the cables 192 subjected to good-way bending. FIG. 8 shows the cables 192 bent toward the right or to the left from the cable exit from the pluggable module 106. FIG. 9 shows the cables 192 bent downward from the cable exit from the pluggable module 106. Good-way bending is preferred compared to bad-way bending (FIG. 7). When the cables 192 are bent in a good-way, the cables 192 are bent such that the ends 198 are at the radially interiors of the cables 192. The bending occurs along the flat end 198 and thus spreads the bending equally across the cable 192. The conductors 193, 194 maintain equal spacing relative to the shield 196. Good-way bending has improved signal integrity and electrical performance as compared to the bad-way bending. The cable organizer 200 (FIG. 6) is used to encourage good-way bending from the cable exit from the pluggable module 106.

Figure 10:
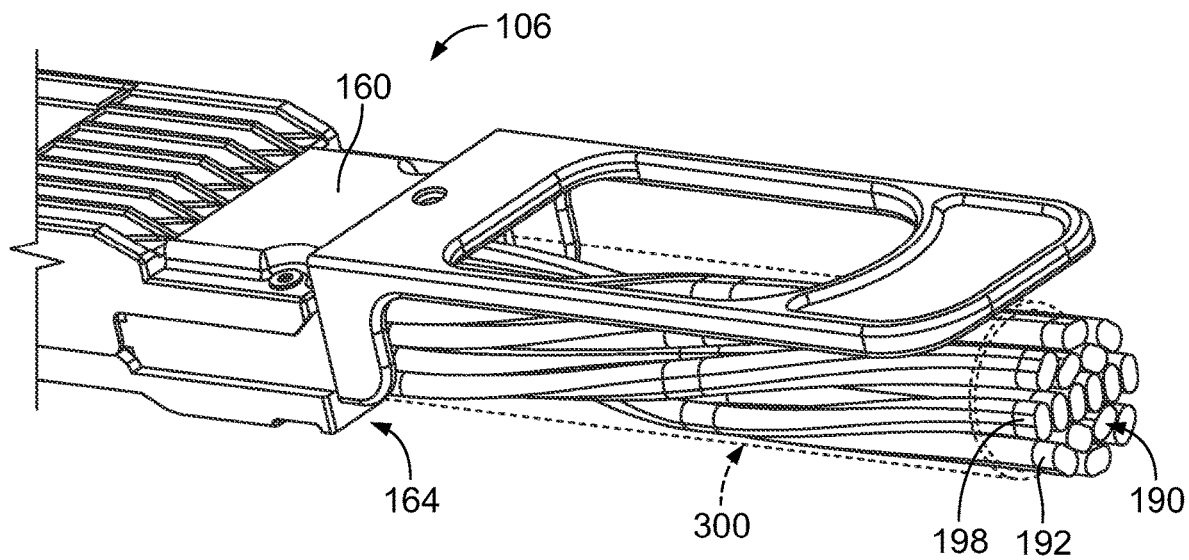
FIG. 10 is a perspective view of the pluggable module showing a cable organizer in accordance with an exemplary embodiment.

FIG. 10 is a perspective view of the pluggable module 106 showing a cable organizer 300 in accordance with an exemplary embodiment. A portion of the cable organizer 300 is shown in phantom to illustrate the cables 192 inside the cable organizer 300. The cable organizer 300 may be coupled to the housing 160 at the cable end 164. The cable organizer 300 may extend rearward of the housing 160 to provide strain relief and organization of the cables 192. The cable organizer 300 orients the cables 192 relative to each other to prevent bad-way bending of the cables 192 downstream of the housing 160. In an exemplary embodiment, the cable organizer 300 induces cable twist in the cables 192 to change relative orientations of the cables 192. For example, the cable organizer 300 holds the cables 192 such that the ends 198 of the cables 192 are non-parallel to the ends 198 of other cables 192. The twist in the cables 192 causes each of the cables 192 to naturally lay in a good-way at the bent section. For example, the ends 198 of cables 192 both upstream and downstream of the bent area face the bend direction, which forces the cables 192 to twist and lay with the ends 198 at the radially interiors of the cables 192 at the bent area.

Figure 11:
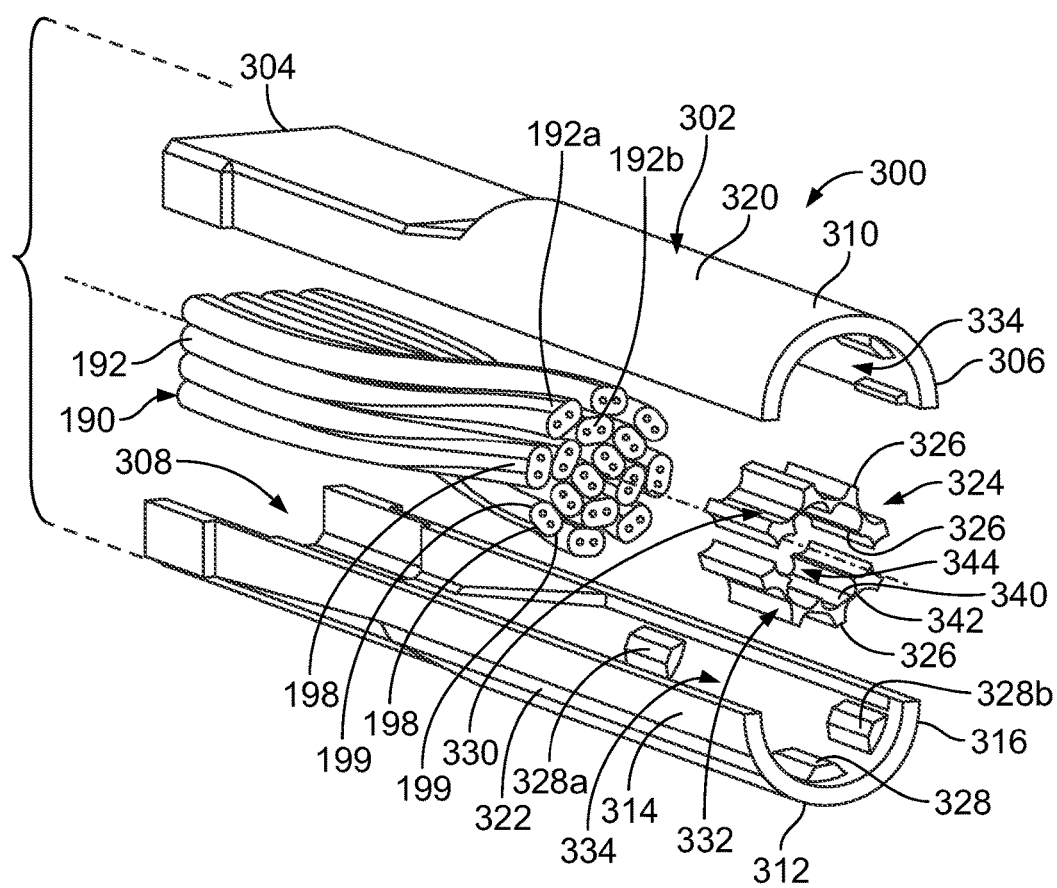
FIG. 11 is an exploded view of the cable organizer in accordance with an exemplary embodiment.

FIG. 11 is an exploded view of the cable organizer 300 in accordance with an exemplary embodiment. The cable organizer 300 is configured to be coupled to the cables 192 (shown in FIG. 10) to position the cables 192 relative to each other. In an exemplary embodiment, the cable organizer 300 is used to orient the cables 192 to mitigate bad-way bending of the cables 192 along their paths. For example, the cable organizer 300 induces helical twisting of the cables 192 relative to each other. The twisting encourages good-way bending and discourages bad-way bending to improve signal integrity of the cables 192.

The cable organizer 300 includes a main body 302 extending between a front 304 and a rear 306. The cable organizer 300 includes an internal cavity 308 between the front 304 and the rear 306 that receives the cables 192. The cable organizer 300 includes a top 310, a bottom 312, a first side 314, and a second side 316. The sides 314, 316 extend between the top 310 and the bottom 312 and extend between the front 304 and the rear 306. In the illustrated embodiment, the cable organizer 300 may be box-shaped having a generally rectangular cross-section at the front 304 and may be cylindrical having a generally circular cross-section at the rear 306. The exterior of the main body 302 transitions between the rectangular and circular cross-sections. The cable organizer may have other shapes in alternative embodiments.

In an exemplary embodiment, the main body 302 may be a multi-piece body. For example, in the illustrated embodiment, the main body 302 includes an upper shell 320 defining an upper body portion, a lower shell 322 defining a lower body portion, and an organizer ring 324 received in the internal cavity 308 between the upper and lower shells 320, 322. The upper and lower shells 320, 322 may be coupled together to form the cavity 308. The organizer ring 324 is located within the cable bundle 190 to engage and orient the cables 192 relative to each other. The upper and lower shells 320, 322 cooperate with the organizer ring 324 to engage and orient the cables 192 relative to each other. For example, the organizer ring 324 includes ring tabs 326 extending therefrom configured to engage and position the cables 192 and the shells 320, 322 include shell tabs 328 extending into the cavity 308 to engage and position the cables 192. The ring tabs 326 form inner cable channels 330 configured to receive corresponding cables 192. The shell tabs 328 form outer cable channels 332 configured to receive corresponding cables 192. The cable channels 330, 332 are sized and shaped to receive the cables 192 and orient the cables 192 (for example, tightly hold the cables 192) relative to each other. For example, the cable channels 330, 332 may be complimentary shaped to the cables 192. In an exemplary embodiment, the ring tabs 326 and the shell tabs 328 are configured to engage the sides 199 of the cables 192. The portions of the organizer ring 324 between the ring tabs 326 and the portions of the shells 320, 322 between the shell tabs 328 are configured to engage the ends 198. As such, the shells 320, 322 and the organizer ring 324 cooperate to orient the cables 192 in the cavity 308.

The organizer ring 324 of the cable organizer 300 is ring shaped having an inner surface 340 and an outer surface 342. The inner surface 340 surrounds an opening 344. The opening 344 receives corresponding cables 192 therein such that the cables 192 extend along the inner surface 340. In an exemplary embodiment, the cables 192 may additionally extend along the outer surface 342. The ring tabs 326 extend from the inner surface 340 and from the outer surface 342 to form the cables channels 330 along the inner surface 340 and the outer surface 342. The cables 192 are routed in corresponding cable channels 330 inside of the inner surface 340 and are routed in corresponding cable channels 330 outside of the outer surface 342. In an exemplary embodiment, the inner surface 340 and the outer surface 342 are configured to support the ends 198 of the cables 192 and the ring tabs 326 are configured to support the sides 199 of the cables 192. As such, the cables 192 are configured to be positioned circumferentially around the organizer ring 324 at different relative orientations. For example, the cable organizer 300 holds the cables 192 such that the ends 198 of the cables 192 are non-parallel to the ends 198 of other cables 192. In an exemplary embodiment, the cable channels 330 may extend along non-linear paths. For example, the cable channels 330 may extend along helical paths to induce twisting of the cables 192 as the cables 192 pass through the organizer ring 324. For example, the side surfaces of the ring tabs 326 may extend along helical paths rather than extending parallel to the longitudinal axis. However, in alternative embodiments, the cable channels 330 may extend along longitudinal paths through the organizer ring 324.

The organizer ring 324 is positioned in the cavity 308 between the upper and lower shells 320, 322 to engage the cables 192 and cause twisting of the cables 192 as the cables 192 pass through the cavity 308. For example, the ring tabs 326 of the organizer ring 324 and the shell tabs 328 of the upper and lower shells 320, 322 cause the cables 192 to follow helical paths through the cable organizer 300. Radially outer cables 192a are captured between the organizer ring 324 and the shells 320, 322. Radially inner cables 192b are routed through the opening 344 of the organizer ring 324. The cables 192 are held at different orientations with the ends 198 being non-parallel to each other, such as at different rotational orientations. For example, the ends 198 of some of the cables 192 may be oriented parallel to the top 310 and the bottom 312 of the cable organizer 300 while the ends 198 of other cables 192 are non-parallel to the top 310 and the bottom 312.

In an exemplary embodiment, the upper and lower shells 320, 322 include different sets of the shell tabs 328, such as forward shell tabs 328a and rearward shell tabs 328b. The upper and lower shells 320, 322 have pockets 334 between the forward and rearward shell tabs 328a, 328b. In an exemplary embodiment, the organizer ring 324 is received in the pockets 334. For example, the organizer ring 324 is offset from the forward shell tabs 328a and the rearward shell tabs 328b. The ring tabs 326 may be rotationally offset from the shell tabs 328 to induce twisting of the cables 192 through the cable organizer 300. In alternative embodiments, the organizer ring 324 may be aligned with the forward shell tabs 328a and/or the rearward shell tabs 328b.

The cable organizer 300 induces helical twisting of the cables 192 relative to each other. The twisting encourages good-way bending and discourages bad-way bending to improve signal integrity of the cables 192. The twist in the cables 192 causes each of the cables 192 to naturally lay in a good-way when bent. For example, the ends 198 of cables 192 both upstream and downstream of the bend face the bend direction. The cables 192 are movable relative to each other within the cable bundle 190 and the cables 192 may twist and lay with all of the ends 198 at the radially interiors of the cables 192 at the bend.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A pluggable module comprising:
    a housing having a top wall, a bottom wall and sidewalls between the top wall and the bottom wall, the housing forming a module cavity, the housing having a mating end configured to be mated with a communication connector of a receptacle assembly, the housing having a cable end opposite the mating end;
    a module circuit board received in the module cavity, the module circuit board having a card edge at a front of the module circuit board configured to be plugged into a card slot of the communication connector, the module circuit board having board contacts proximate to the card edge, the module circuit board having cable contacts electrically connected to the board contacts;
    cables arranged as a cable bundle extending from the module cavity at the cable end, each cable including a first conductor, a second conductor and at least one insulator surrounding the first and second conductors, the first and second conductors being terminated to corresponding cable contacts of the module circuit board, each cable being obround shaped having a first end and a second end opposite the first end and parallel to the first end and having a first side and a second side between the first and second ends being semi-circular; and
    a cable organizer coupled to the cable bundle to position a plurality of the cables relative to each other, the cable organizer having cable channels receiving corresponding cables and holding the cables in at least a first subset of the cables and a second subset of the cables, the cables of the first subset being oriented parallel to each other in the corresponding cable channels through the cable organizer, the cables of the second subset being oriented parallel to each other in the corresponding cable channels through the cable organizer, the first subset of the cables are oriented with the first and second ends non parallel to the first and second ends of the second subset of the cables.

2. The pluggable module of claim 1, wherein each cable channel is defined by a cable end support, a first cable side support and a second cable side support, the cable being received in the cable channel such that the first end of the cable engages the cable end support, the first side of the cable engages the first cable side support and the second side of the cable engages the second cable side support.

3. The pluggable module of claim 2, wherein the cable channels include a first cable channel and a second cable channel, the cable end support of the first cable channel being oriented non-parallel to the cable end support of the second cable channel.

4. The pluggable module of claim 1, wherein the cable organizer holds the cables such that the first and second ends are non-parallel to upper and lower surfaces of the module circuit board.

5. The pluggable module of claim 1, wherein the cable organizer holds the cables such that the cables are twisted between the cable organizer and the module circuit board.

6. The pluggable module of claim 1, wherein the cable organizer includes a top, a bottom, a first side, and a second side, the cable channels holding the cables in the cable organizer such that the first and second ends of the cables are oriented at approximately 45° relative to the top and the bottom.

7. The pluggable module of claim 1, wherein the cable organizer includes a top, a bottom, a first side, and a second side, the cable channels holding a first subset of the cables in the cable organizer such that the first and second ends of the first subset of the cables are oriented at approximately +45° relative to the top and the bottom, the cable channels holding a second subset of the cables in the cable organizer such that the first and second ends of the second subset of the cables are oriented at approximately −45° relative to the top and the bottom.

8. The pluggable module of claim 1, wherein the cable organizer includes an upper body portion and a lower body portion coupled to the upper body portion, the upper body portion including a first subset of the cable channels, the lower body portion including a second subset of the cable channels.

9. The pluggable module of claim 1, wherein the cable organizer includes an upper body portion and a lower body portion coupled to the upper body portion, the upper body portion including inner cable channels of the cable channels and outer cable channels of the cable channels, the lower portion including inner cable channels of the cable channels and outer cable channels of the cable channels.

10. The pluggable module of claim 1, wherein the cable organizer is coupled to the housing at the cable end.

11. The pluggable module of claim 1, wherein the cable channels extend along non-linear paths.

12. The pluggable module of claim 1, wherein the cable channels extend along helical paths to induce twisting of the cables as the cables pass through the cable organizer.

13. The pluggable module of claim 1, wherein the cable organizer includes an inner ring and an outer shell, the outer shell including shell tabs forming portions of the cable channels, the inner ring including ring tabs forming portions of the cable channels, the ring tabs being offset from the shell tabs to induce twisting of the cables in the cable bundle as the cables pass through the cable organizer.

14. The pluggable module of claim 1, wherein the cables have first sections that pass through the cavity from the module circuit board to the cable organizer and second sections that pass through the cable organizer, the cables having a first pattern along the first sections and a second pattern along the second sections different from the first pattern.

15. A pluggable module comprising:
a housing having a top wall, a bottom wall and sidewalls between the top wall and the bottom wall, the housing forming a module cavity, the housing having a mating end configured to be mated with a communication connector of a receptacle assembly, the housing having a cable end opposite the mating end;
a module circuit board received in the module cavity, the module circuit board having a card edge at a front of the module circuit board configured to be plugged into a card slot of the communication connector, the module circuit board having board contacts proximate to the card edge, the module circuit board having cable contacts electrically connected to the board contacts;
cables arranged as a cable bundle extending from the module cavity at the cable end, each cable including a first conductor, a second conductor and at least one insulator surrounding the first and second conductors, the first and second conductors being terminated to corresponding cable contacts of the module circuit board, each cable being obround shaped having a first end and a second end opposite the first end and parallel to the first end and having a first side and a second side between the first and second ends being semi-circular; and
a cable organizer coupled to the cable bundle to position a plurality of the cables relative to each other, the cable organizer having cable channels receiving corresponding cables and holding the cables such that at least a first subset of the cables are oriented with the first and second ends non parallel to the first and second ends of a second subset of the cables;
wherein the cable organizer is ring shaped having an inner surface and an outer surface, the inner surface surrounding an opening, the inner surface having corresponding cable channels and the outer surface having corresponding cable channels such that cables are routed inside of the inner surface and outside of the outer surface.

16. A pluggable module comprising:
a housing having a top wall, a bottom wall and sidewalls between the top wall and the bottom wall, the housing forming a module cavity, the housing having a mating end configured to be mated with a communication connector of a receptacle assembly, the housing having a cable end opposite the mating end;
a module circuit board received in the module cavity, the module circuit board having a card edge at a front of the module circuit board configured to be plugged into a card slot of the communication connector, the module circuit board having board contacts proximate to the card edge, the module circuit board having cable contacts electrically connected to the board contacts;
cables arranged as a cable bundle extending from the module cavity at the cable end, each cable including a first conductor, a second conductor and at least one insulator surrounding the first and second conductors, the first and second conductors being terminated to corresponding cable contacts of the module circuit board, each cable being obround shaped having a first end and a second end opposite the first end and parallel to the first end and having a first side and a second side between the first and second ends being semi-circular; and
a cable organizer coupled to the cable bundle to position a plurality of the cables relative to each other, the cable organizer including a top, a bottom, a first side, and a second side extending between a front and a rear of the cable organizer, the cable organizer having cable channels receiving corresponding cables, each cable channel extending along a straight path through the cable organizer between the front and the rear, the cable channels holding the cables in the cable organizer such that the first and second ends of the cables are oriented at approximately 45° relative to the top and the bottom of the cable organizer.

17. A cable organizer for organizing cables in a cable bundle, each cable having a first conductor, a second conductor and at least one insulator surrounding the first and second conductors, each cable being obround shaped having a first end and a second end opposite the first end and parallel to the first end and having a first side and a second side between the first and second ends being semi-circular, the cable organizer comprising:
a main body including a top, a bottom, a first side, and a second side, the main body extending between a front and a rear;
cable channels extending through the main body between the front and the rear, the cable channels are configured to receive corresponding cables, each cable channel extending along a straight path through the cable organizer between the front and the rear;
wherein the cable channels hold the cables in the cable organizer such that the first and second ends of the cables are oriented at approximately 45° relative to the top and the bottom of the cable organizer.

18. The cable organizer of claim 17, wherein each cable channel is defined by a cable end support, a first cable side support and a second cable side support, the cable channel configured to receive the cable such that the cable end support supports the first end of the cable, the first cable side support supports the first side of the cable, and the second cable side support supports the second side of the cable.

19. The cable organizer of claim 18, wherein the cable channels include a first cable channel and a second cable channel, the cable end support of the first cable channel being oriented non-parallel to the cable end support of the second cable channel.

20. The cable organizer of claim 18, wherein the main body includes an upper body portion and a lower body portion coupled to the upper body portion, the upper body portion including a first subset of the cable channels, the lower body portion including a second subset of the cable channels, the first subset of the cable channels configured to hold the corresponding cables at different orientations than the second subset of the cable channels.

* * * * *